(12) United States Patent
Mouniandy et al.

(10) Patent No.: US 11,777,443 B2
(45) Date of Patent: *Oct. 3, 2023

(54) SYSTEMS AND METHODS FOR TERRAIN BASED BACKTRACKING FOR SOLAR TRACKERS

(71) Applicant: FTC Solar, Inc., Austin, TX (US)

(72) Inventors: Tamilarasan Mouniandy, Chennai (IN); Andrew Joseph Morse, Skyesville, MD (US); Karthikraja Kumaresan, Chennai (IN); Nagendra Srinivas Cherukupalli, Saratoga, CA (US)

(73) Assignee: FTC Solar, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/157,188

(22) Filed: Jan. 20, 2023

(65) Prior Publication Data
US 2023/0155541 A1    May 18, 2023

Related U.S. Application Data

(63) Continuation of application No. 17/446,742, filed on Sep. 2, 2021, now Pat. No. 11,611,311, which is a
(Continued)

(51) Int. Cl.
*G05D 3/10* (2006.01)
*G01S 3/786* (2006.01)
(Continued)

(52) U.S. Cl.
CPC ............ *G05D 3/105* (2013.01); *G01S 3/7861* (2013.01); *G05D 3/12* (2013.01); *H02S 20/32* (2014.12)

(58) Field of Classification Search
None
See application file for complete search history.

(56) References Cited

U.S. PATENT DOCUMENTS

| 4,202,321 A | 5/1980 | Volna |
| 4,223,214 A | 9/1980 | Dorian et al. |

(Continued)

OTHER PUBLICATIONS

US 10,768,266 B2, 09/2020, Corio (withdrawn)
(Continued)

*Primary Examiner* — Santosh R Poudel
(74) *Attorney, Agent, or Firm* — Armstrong Teasdale LLP

(57) ABSTRACT

A system is provided. The system includes a tracker configured to collect solar irradiance and attached to a rotational mechanism for changing a plane of the tracker and a controller in communication with the rotational mechanism. The controller is programmed to store a plurality of positional information and a shadow model for determining placement of shadows based on positions of objects relative to the sun, determine a position of the sun at a first specific point in time, retrieve height information for the tracker and at least one adjacent tracker, execute the shadow model based on the retrieved height information and the position of the sun, determine a first angle for the tracker based on the executed shadow model, and transmit instructions to the rotational mechanism to change the plane of the tracker to the first angle.

20 Claims, 9 Drawing Sheets

Related U.S. Application Data continuation of application No. 16/928,679, filed on Jul. 14, 2020, now Pat. No. 11,139,775.

(51) Int. Cl.
*H02S 20/32* (2014.01)
*G05D 3/12* (2006.01)

(56) References Cited

U.S. PATENT DOCUMENTS

| | | |
|---|---|---|
| 4,226,502 A | 10/1980 | Gunzler |
| 4,328,789 A | 5/1982 | Nelson |
| 4,365,616 A | 12/1982 | Vandenberg |
| 4,383,520 A | 5/1983 | Huebl et al. |
| 4,574,659 A | 3/1986 | Arndt |
| 4,883,340 A | 11/1989 | Dominguez |
| 7,374,137 B2 | 5/2008 | Staney |
| 7,692,091 B2 | 4/2010 | Altaii et al. |
| 8,151,787 B1 | 4/2012 | Sivert |
| 8,274,028 B2 | 9/2012 | Needham |
| 8,413,391 B2 | 4/2013 | Seery et al. |
| 8,459,249 B2 | 6/2013 | Corio |
| 8,502,129 B2 | 8/2013 | Miller et al. |
| 8,511,297 B2 | 8/2013 | McNeil-Yeckel et al. |
| 8,615,939 B2 | 12/2013 | Seery et al. |
| 8,671,930 B2 | 3/2014 | Liao |
| 8,704,082 B2 | 4/2014 | Angoli et al. |
| 8,878,112 B2 | 11/2014 | Lee |
| 8,904,774 B2 | 12/2014 | Gee |
| 8,933,660 B2 | 1/2015 | Heumann et al. |
| 8,993,870 B2 | 3/2015 | Eom |
| 9,038,329 B2 | 5/2015 | Pelman et al. |
| 9,074,797 B2 | 7/2015 | Miller et al. |
| 9,166,525 B2 | 10/2015 | Grant |
| 9,188,367 B2 | 11/2015 | Jang |
| 9,443,999 B2 | 9/2016 | Polk |
| 9,531,320 B2 | 12/2016 | Gonzalez |
| 9,551,508 B2 | 1/2017 | Straeter |
| 9,568,215 B2 | 2/2017 | Patwardhan et al. |
| 9,581,678 B2 | 2/2017 | Corio |
| 9,593,867 B2 | 3/2017 | Seery et al. |
| 9,601,645 B2 | 3/2017 | Seery et al. |
| 9,727,060 B2 | 8/2017 | Coupart |
| 9,766,319 B2 | 9/2017 | Au |
| 9,831,819 B2 | 11/2017 | Kirk et al. |
| 9,863,667 B2 | 1/2018 | Au |
| 9,905,717 B2 | 2/2018 | Au |
| 9,970,686 B2 | 5/2018 | Au |
| 9,998,068 B2 | 6/2018 | Au |
| 10,008,975 B2 | 6/2018 | Au |
| 9,923,510 B2 | 8/2018 | Au |
| 10,042,030 B2 | 8/2018 | Corio |
| 10,075,125 B2 | 9/2018 | Liu et al. |
| 10,171,024 B2 | 1/2019 | Polk |
| 10,222,446 B2 | 3/2019 | Au |
| 10,340,839 B2 | 7/2019 | Almy et al. |
| 10,340,840 B2 | 7/2019 | Almy et al. |
| 10,379,196 B2 | 8/2019 | Au |
| 10,461,682 B2 | 10/2019 | Schuit et al. |
| 10,514,185 B2 | 12/2019 | Ingram |
| 10,541,644 B2 | 1/2020 | Arliaud et al. |
| 10,557,646 B1 | 2/2020 | Ma et al. |
| 10,594,253 B2 | 3/2020 | Henderson et al. |
| 10,619,891 B2 | 4/2020 | Menard |
| 10,630,231 B2 | 4/2020 | Needham et al. |
| 10,648,528 B2 | 5/2020 | Kull et al. |
| 10,654,420 B2 | 5/2020 | Levi |
| 10,684,348 B2 | 6/2020 | Arliaud et al. |
| 10,771,007 B2 | 9/2020 | Corio |
| 10,848,097 B1 | 11/2020 | Needham et al. |
| 2008/0264474 A1 | 10/2008 | Frauenknecht et al. |
| 2008/0308091 A1 | 12/2008 | Corio |
| 2010/0089390 A1 | 4/2010 | Miros et al. |
| 2010/0095955 A1 | 4/2010 | Martinez |
| 2010/0212653 A1 | 8/2010 | McDonald |
| 2010/0307479 A1* | 12/2010 | Park ............... H02S 20/32 126/714 |
| 2011/0041834 A1 | 2/2011 | Liao |
| 2012/0125399 A1 | 5/2012 | Schatz et al. |
| 2012/0152310 A1 | 6/2012 | Hinman et al. |
| 2012/0152311 A1 | 6/2012 | Miller et al. |
| 2012/0174962 A1 | 7/2012 | Koningstein et al. |
| 2013/0019921 A1 | 1/2013 | Au |
| 2013/0048048 A1 | 2/2013 | Flanery et al. |
| 2013/0247962 A1 | 9/2013 | Sakai et al. |
| 2013/0319402 A1 | 12/2013 | Shaw |
| 2013/0341294 A1 | 12/2013 | Reynolds et al. |
| 2014/0209146 A1 | 7/2014 | Park et al. |
| 2014/0224300 A1 | 8/2014 | Liu |
| 2014/0338659 A1 | 11/2014 | Corio |
| 2015/0355017 A1 | 12/2015 | Clarke et al. |
| 2015/0377518 A1 | 12/2015 | Maxet et al. |
| 2016/0118929 A1 | 4/2016 | Krause |
| 2016/0140283 A1 | 5/2016 | Morse et al. |
| 2016/0336900 A1 | 11/2016 | Paponneau et al. |
| 2017/0025989 A1 | 1/2017 | Shaw |
| 2017/0093329 A1 | 3/2017 | Jensen |
| 2017/0102168 A1 | 4/2017 | Childress |
| 2017/0220708 A1 | 8/2017 | He |
| 2017/0301814 A1 | 10/2017 | Au |
| 2017/0353145 A1 | 12/2017 | Yang |
| 2018/0013380 A1 | 1/2018 | Childress et al. |
| 2018/0024222 A1 | 1/2018 | Au |
| 2018/0054156 A1 | 2/2018 | Lokey |
| 2018/0076757 A1 | 3/2018 | Gross et al. |
| 2018/0091088 A1 | 3/2018 | Barton et al. |
| 2018/0167025 A1 | 6/2018 | Au |
| 2018/0224161 A1 | 8/2018 | Au |
| 2018/0302026 A1 | 10/2018 | Basel et al. |
| 2018/0302027 A1 | 10/2018 | Betts et al. |
| 2018/0341002 A1 | 11/2018 | Augustlyn |
| 2018/0358921 A1 | 12/2018 | Henderson et al. |
| 2019/0036478 A1 | 1/2019 | Liu et al. |
| 2019/0131920 A1 | 5/2019 | Au |
| 2019/0199276 A1 | 6/2019 | Bailey et al. |
| 2019/0204405 A1 | 7/2019 | Arliaud et al. |
| 2019/0296686 A1 | 9/2019 | Kresse et al. |
| 2019/0296688 A1 | 9/2019 | Kresse et al. |
| 2019/0319578 A1 | 10/2019 | Needham et al. |
| 2019/0356265 A1 | 11/2019 | Liu et al. |
| 2020/0036325 A1 | 1/2020 | Poivet |
| 2020/0076356 A1 | 3/2020 | Cherukupalli et al. |
| 2020/0076359 A1 | 3/2020 | Bahn |
| 2020/0153381 A1 | 5/2020 | De Well et al. |
| 2020/0162015 A1 | 5/2020 | Upfill-Brown et al. |
| 2020/0182513 A1 | 6/2020 | Ma et al. |
| 2020/0235696 A1 | 7/2020 | Arliaud et al. |
| 2020/0309893 A1 | 10/2020 | Arliaud et al. |
| 2021/0103302 A1* | 4/2021 | Lee ............... G01S 3/7861 |
| 2021/0218362 A1 | 7/2021 | Munoz Benavente et al. |
| 2021/0273602 A1 | 9/2021 | Gu et al. |

OTHER PUBLICATIONS

Schneider, Dorian—"Control Algorithms for Large Scale, Single Axis Photovoltaic Trackers," Proceedings of the 16th International Student Conference on Electrical Engineering, Poster May 17, 2012, Prague; Acta Polytechnica, 52(5), 7 page (2012).

* cited by examiner

SYSTEMS AND METHODS FOR TERRAIN BASED BACKTRACKING FOR SOLAR TRACKERS

CROSS REFERENCE TO RELATED APPLICATIONS

This application is a continuation of U.S. patent application Ser. No. 17/446,742, filed Sep. 2, 2021, entitled "SYSTEMS AND METHODS FOR TERRAIN BASED BACKTRACKING FOR SOLAR TRACKERS," which is a continuation of U.S. patent application Ser. No. 16/928,679, filed Jul. 14, 2020, entitled "SYSTEMS AND METHODS FOR TERRAIN BASED BACKTRACKING FOR SOLAR TRACKERS," which issued as U.S. Pat. No. 11,139,775 on Oct. 5, 2021, the entire contents and disclosure of which are hereby incorporated by reference herein in their entirety.

BACKGROUND

The field relates generally to tracking systems for adjusting solar trackers and, more specifically, to determining angles for solar trackers to maximize production and reduce shadows based on the terrain at the location of the solar tracker.

Recently, the development of a variety of energy substitution such as, a clean energy source and environment friendly energy are emerging to replace fossil fuels due to the shortage of fossil fuels, environmental contamination issues, etc. One of the solutions is to use solar energy. This type of solar energy use can be categorized into three types; one of the types converts solar energy to heat energy and uses it for heating or boiling water. The converted heat energy can also be used to operate a generator to generate electric energy. The second type is used to condense sunlight and induce it into fiber optics which is then used for lighting. The third type is to directly convert light energy of the sun to electric energy using solar cells.

Solar trackers are groups of collection devices, such as solar modules. Some solar trackers are configured to follow the path of the sun to minimize the angle of incidence between incoming sunlight and the solar tracker to maximize the solar energy collected. To face the sun correctly, a program or device to track the sun is necessary. This is called a sunlight tracking system or tracking system. The method to track the sunlight can generally be categorized as a method of using a sensor or a method of using a program.

In terms of a power generation system using solar energy, a large number of solar trackers are generally installed on a vast area of flat land and as it is impossible to install more than two modules of solar trackers to overlap, a vast space of land is required. But, when multiple solar trackers are installed, shade can occur due to interference between the solar trackers, and sunlight cannot be fully absorbed when the sun does not arise above a certain angle or due to weather conditions.

Furthermore, some solar trackers are installed in areas with changes in elevation between solar trackers. In these situations, significant shading from other trackers can occur.

BRIEF DESCRIPTION

In one aspect, a system is provided. The system includes a tracker attached to a rotational mechanism for changing a plane of the tracker. The tracker is configured to collect solar irradiance. The system also includes a controller in communication with the rotational mechanism. The controller includes at least one processor in communication with at least one memory device. The at least one processor is programmed to store, in the at least one memory device, a plurality of positional information and a shadow model for determining placement of shadows based on positions of objects relative to the sun. The at least one processor is also programmed to determine a position of the sun at a first specific point in time. The at least one processor is further programmed to retrieve, from the at least one memory device, height information for the tracker and at least one adjacent tracker. A first height of the tracker is different than a second height of the at least one adjacent tracker. In addition, the at least one processor is programmed to execute the shadow model based on the retrieved height information and the position of the sun. Moreover, the at least one processor is programmed to determine a first angle for the tracker based on the executed shadow model. Furthermore, the at least one processor is programmed to transmit instructions to the rotational mechanism to change the plane of the tracker to the first angle.

In another aspect, a method for operating a tracker is provided. The method is implemented by at least one processor in communication with at least one memory device. The method includes storing, in the at least one memory device, a plurality of positional information and a shadow model for determining placement of shadows based on positions of objects relative to the sun. The method also includes determining a position of the sun at a first specific point in time. The method further includes retrieving, from the at least one memory device, height information for the tracker and at least one adjacent tracker. A first height of the tracker is different than a second height of the at least one adjacent tracker. In addition, the method includes executing the shadow model based on the retrieved height information and the position of the sun. Moreover, the method includes determining a first angle for the tracker based on the executed shadow model. Furthermore, the method includes transmitting instructions to change a plane of the tracker to the first angle.

In yet another aspect, a controller for a tracker is provided. The controller includes at least one processor in communication with at least one memory device. The at least one processor is programmed to store, in the at least one memory device, a plurality of positional information and a shadow model for determining placement of shadows based on positions of objects relative to the sun. The at least one processor is also programmed to determine a position of the sun at a first specific point in time. The at least one processor is further programmed to retrieve, from the at least one memory device, height information for the tracker and at least one adjacent tracker. A first height of the tracker is different than a second height of the at least one adjacent tracker. In addition, the at least one processor is programmed to execute the shadow model based on the retrieved height information and the position of the sun. Moreover, at least one processor is programmed to determine a first angle for the tracker based on the executed shadow model. Furthermore, the at least one processor is programmed to transmit instructions to change a plane of the tracker to the first angle.

BRIEF DESCRIPTION OF THE DRAWINGS

Corresponding reference characters indicate corresponding parts throughout the drawings.

DETAILED DESCRIPTION

The systems and processes are not limited to the specific embodiments described herein. In addition, components of each system and each process can be practiced independent and separate from other components and processes described herein. Each component and process also can be used in combination with other assembly packages and processes.

Figure 1:
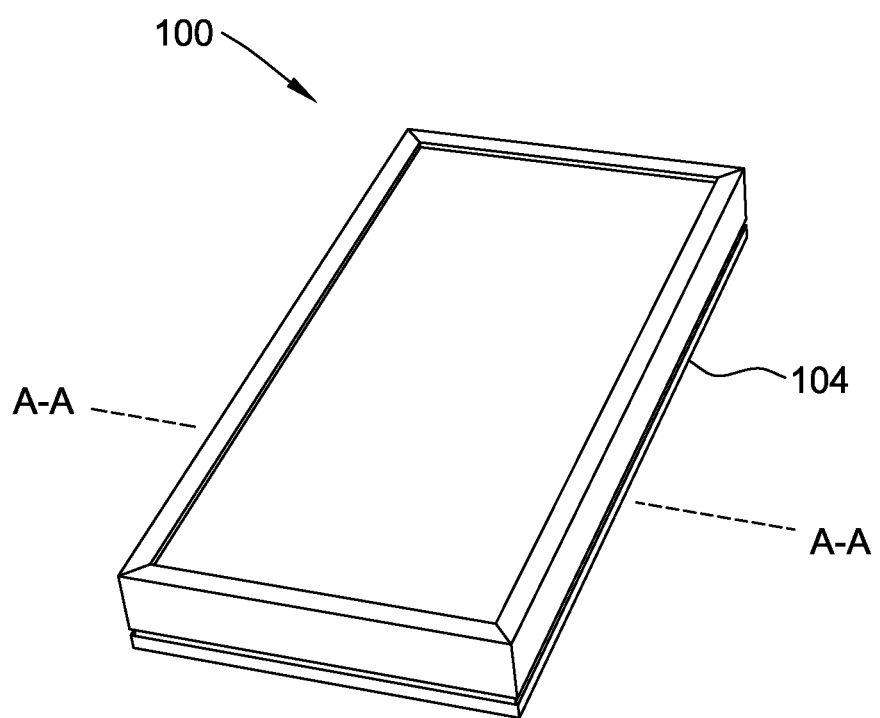
FIG. 1 is a perspective view of a solar module of a solar tracker.
Figure 2:
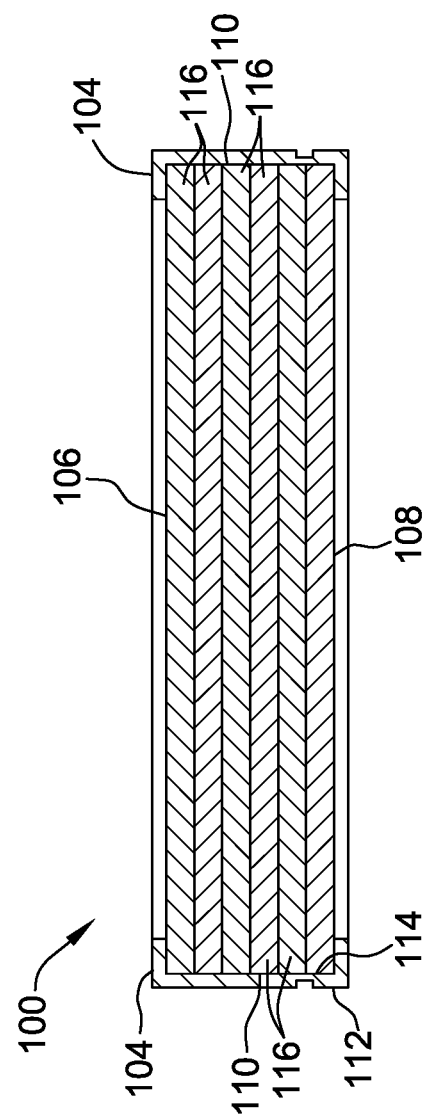
FIG. 2 is a cross-sectional view of the solar module taken along line A-A of FIG. 1.

FIG. 1 is a perspective view of a solar module 100 of a solar tracker. FIG. 2 is a cross-sectional view of the solar module 100 (shown in FIG. 1) taken along line A-A of FIG. 1.

The module 100 includes a top surface 106 and a bottom surface 108. Edges 110 extend between the top surface 106 and the bottom surface 108. Module 100 is rectangular shaped. In other embodiments, module 100 may have any shape that allows the module 100 to function as described herein.

A frame 104 circumscribes and supports the module 100. The frame 104 is coupled to the module 100, for example as shown in FIG. 2. The frame 104 protects the edges 110 of the module 100. The frame 104 includes an outer surface 112 spaced from one or more layers 116 of the module and an inner surface 114 adjacent to the one or more layers 116. The outer surface 112 is spaced from, and substantially parallel to, the inner surface 114. The frame 104 may be made of any suitable material providing sufficient rigidity including, for example, metal or metal alloys, plastic, fiberglass, carbon fiber, and other material capable of supporting the module 100 as described herein. In some embodiments, the frame is made of aluminum, such as 6000 series anodized aluminum.

In the illustrated embodiment, the module 100 is a photovoltaic module. The module 100 has a laminate structure that includes a plurality of layers 116. Layers 116 include, for example, glass layers, non-reflective layers, electrical connection layers, n-type silicon layers, p-type silicon layers, backing layers, and combinations thereof. In other embodiments, the module 100 may have more or fewer layers 116 than shown in FIG. 2, including only one layer 116. The photovoltaic module 100 may include a plurality of photovoltaic modules with each module made of photovoltaic cells.

In some embodiments, the module 100 is a thermal collector that heats a fluid such as water. In such embodiments, the module 100 may include tubes of fluid which are heated by solar radiation. While the present disclosure may describe and show a photovoltaic module, the principles disclosed herein are also applicable to a solar module 100 configured as a thermal collector or sunlight condenser unless stated otherwise.

Figure 3:
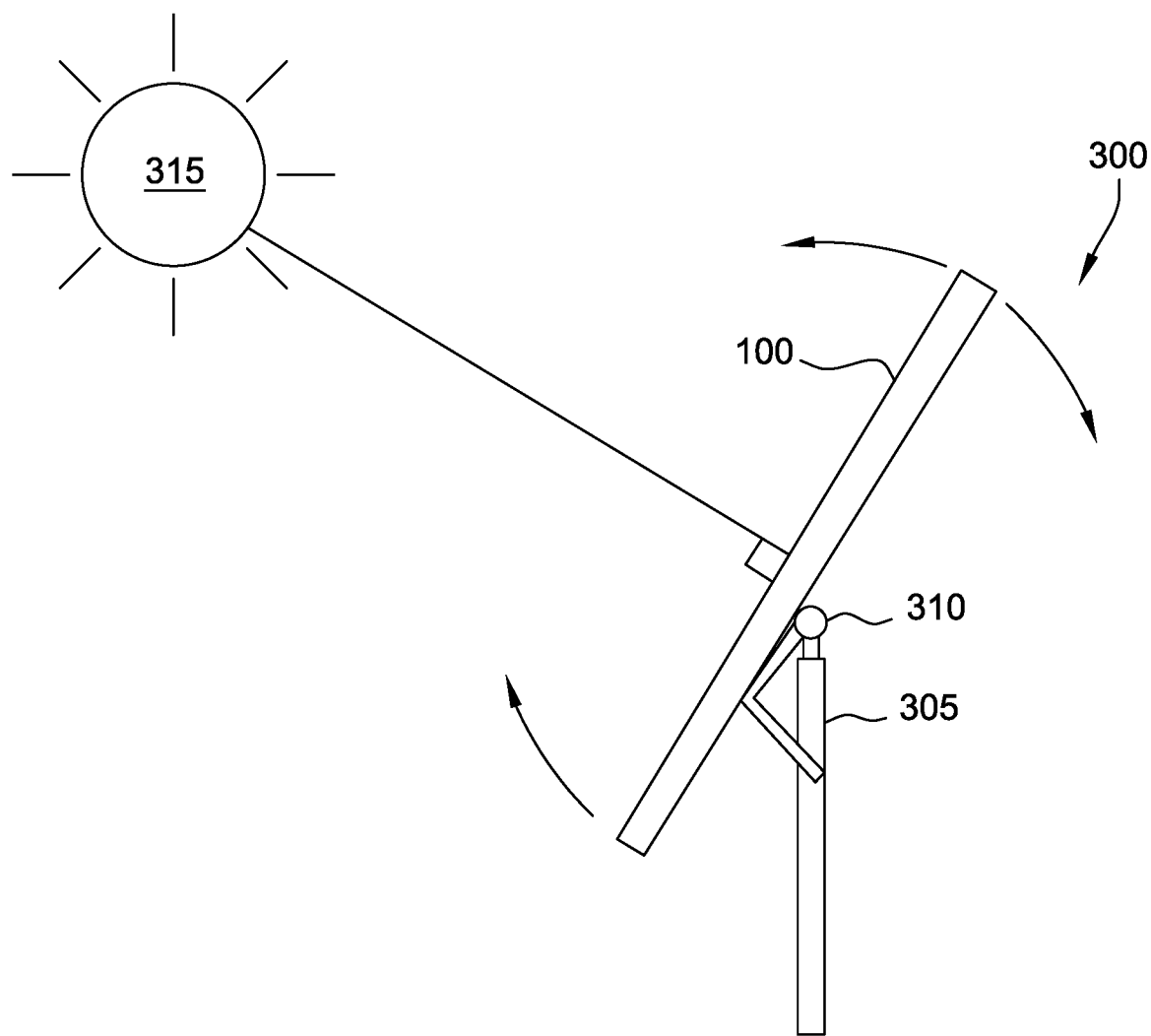
FIG. 3 is a side view of a solar tracker in accordance with at least one embodiment.

FIG. 3 is a side view of a tracker 300 in accordance with at least one embodiment. Tracker 300 includes a plurality of modules 100 (shown in FIG. 1). The tracker 300 (also known as a tracker row) controls the position of a plurality of modules 100. The tracker 300 includes support columns 305 and one or more rotational mechanisms 310. The rotational mechanism 310 is configured to rotate the tracker 300 to track the sun 315 as described herein. In the example, the rotational mechanism 310 rotates the tracker 300 along a single axis from −60 degrees to 60 degrees, where 0 degrees is horizontal. Rotation mechanism 310 can be any rotational mechanism 310 able to move the tracker 300 between angles as described herein. The rotational mechanism 310 can include, but is not limited to, linear actuators and slew drives.

The tracker 300 can include a single module or a plurality of modules 100. The tracker 300 can also include an entire row of modules 100 positioned side-by-side. Or any other combination of modules 100 that allows the tracker 300 to work as described herein.

Figure 4:
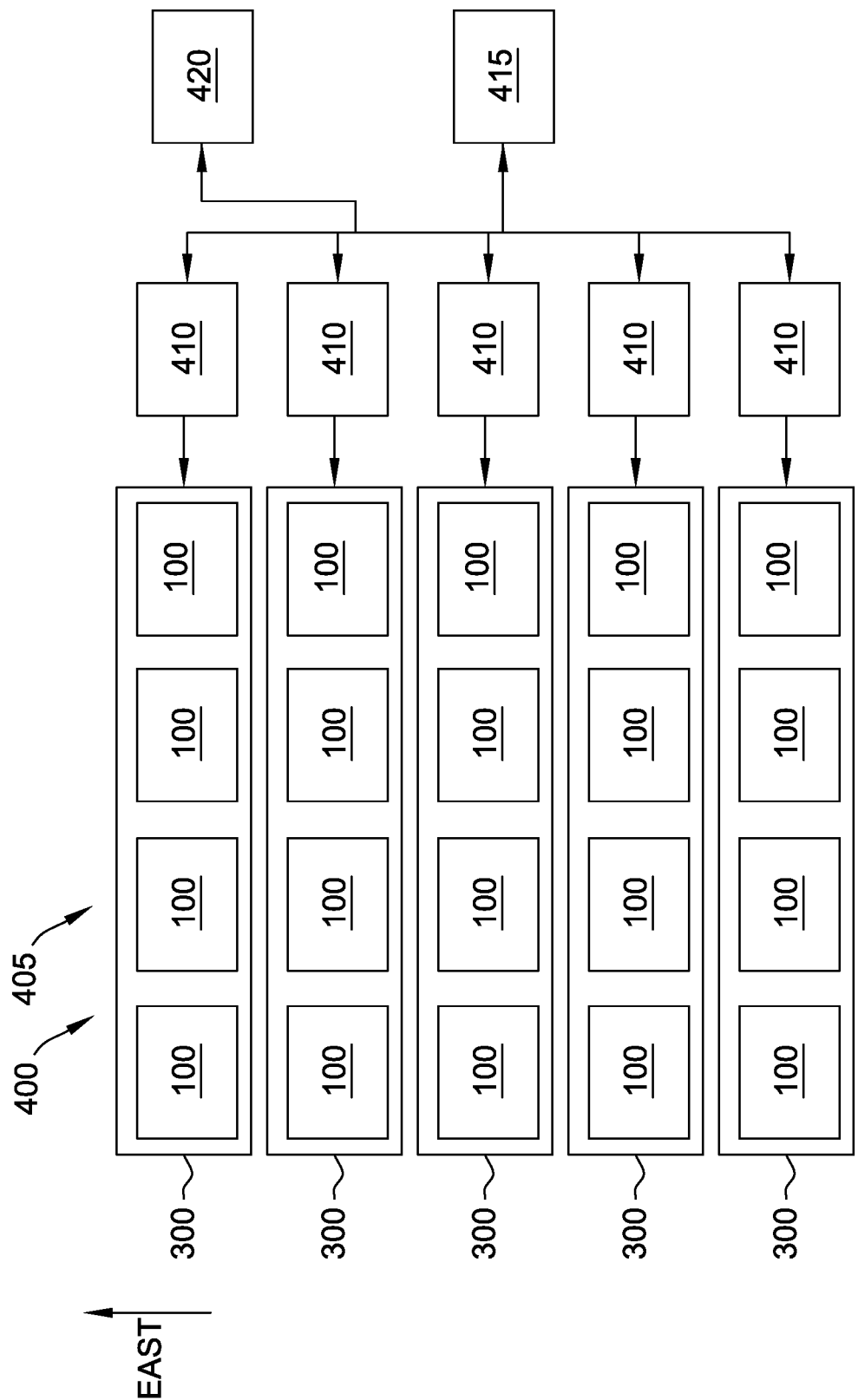
FIG. 4 is an overhead view of an example solar array at a solar site.

FIG. 4 is an overhead view of an example solar array 400 at a solar site 405. The solar array 400 includes a plurality of trackers 300, where each tracker 300 includes a plurality of modules 100 positioned in a row. The solar site 405 includes a plurality of solar arrays 400. The trackers 300 are configured to rotate so that the top surface 106 (shown in FIG. 2) of each tracker is perpendicular to the angle of the sun 315 (shown in FIG. 3).

The position of each tracker 300 is controlled by a row controller 410. The row controller 410 calculates the angle for the modules 100 in the tracker 300 and instructs a rotational mechanism 310 (shown in FIG. 3) to move the tracker 300 to that angle. The rotational mechanism 310 can be capable of moving a tracker 300, which can consist of a single module 100, an entire row of modules 100, or a portion of a row of modules 100. A tracker 300 can include multiple rotational mechanisms 310. Single rotational mechanism 310 can adjust multiple trackers 300.

The row controller 410 of this embodiment is in communication with a site controller 415. The site controller 415 can provide information to the row controller 410 such as, but not limited to, weather information, forecast information, sun position information, and other information to allow the row controller 410 to operate as described herein. In some embodiment, site controller 415 may only be an array zone controller, which controls and sends information to a plurality of row controllers 410 in an array 400, but is only in communication with a portion of the row controllers at the site 405.

The row controller 410 and/or the site controller 415 are in communication with one or more sensors 420 located at the solar site 405. The one or more sensors 420 measure conditions at the solar site 405.

The row controller 410 is programmed to determine the position of the sun and the corresponding angle of the trackers 300 in this embodiment. For each tracker 300, the row controller 410 determines the sun's position with respect to the center of the tracker 300. The row controller 410 stores the latitude, longitude, and altitude of the tracker 300. In at least one embodiment, the row controller 410 calculates the current position of the sun using the National Renewable Energy Lab's (NREL) equations to calculate the sun's position at any given point in time. In alternative embodiments, the row controller 410 is in communication with one or more sensors 420 capable of determining the sun's current position. The row controller 410 is programmed to maximize the energy yield for the trackers 300 by minimizing the angle between the sun vector and the normal vector of the plane of the tracker 300.

The row controller 410 instructs the rotational mechanism 310 to adjust the plane of the tracker 300, so that the plane of the tracker 300 does not deviate by more than +/−1 degree while tracking the sun. In some embodiments, the row controller 410 provides a step size to the angle of the plane of the tracker 300 of two degrees. This means that the row controller 410 adjusts the plane of the tracker 300 for every two degrees the sun moves. The row controller 410 can adjust the angle of the plane of the tracker 300 by any amount, limited by the mechanical tolerances of the tracker 300 and the rotational mechanism 310. In some embodiments, the row controller 410 instructs the rotation mechanisms 310 to adjust each tracker 300 individually, where trackers 300 in the same row may be adjusted to different angles. In other embodiments, the row controller 410 transmits instructions to the trackers 300 in a single row that all of the trackers 300 in that row should be adjusted to the same angle. In some further embodiments, the row controller 410 may transmit instructions to trackers 300 in different rows 405. For example, a row controller 410 may control trackers 300 in two adjacent rows.

Figure 5:
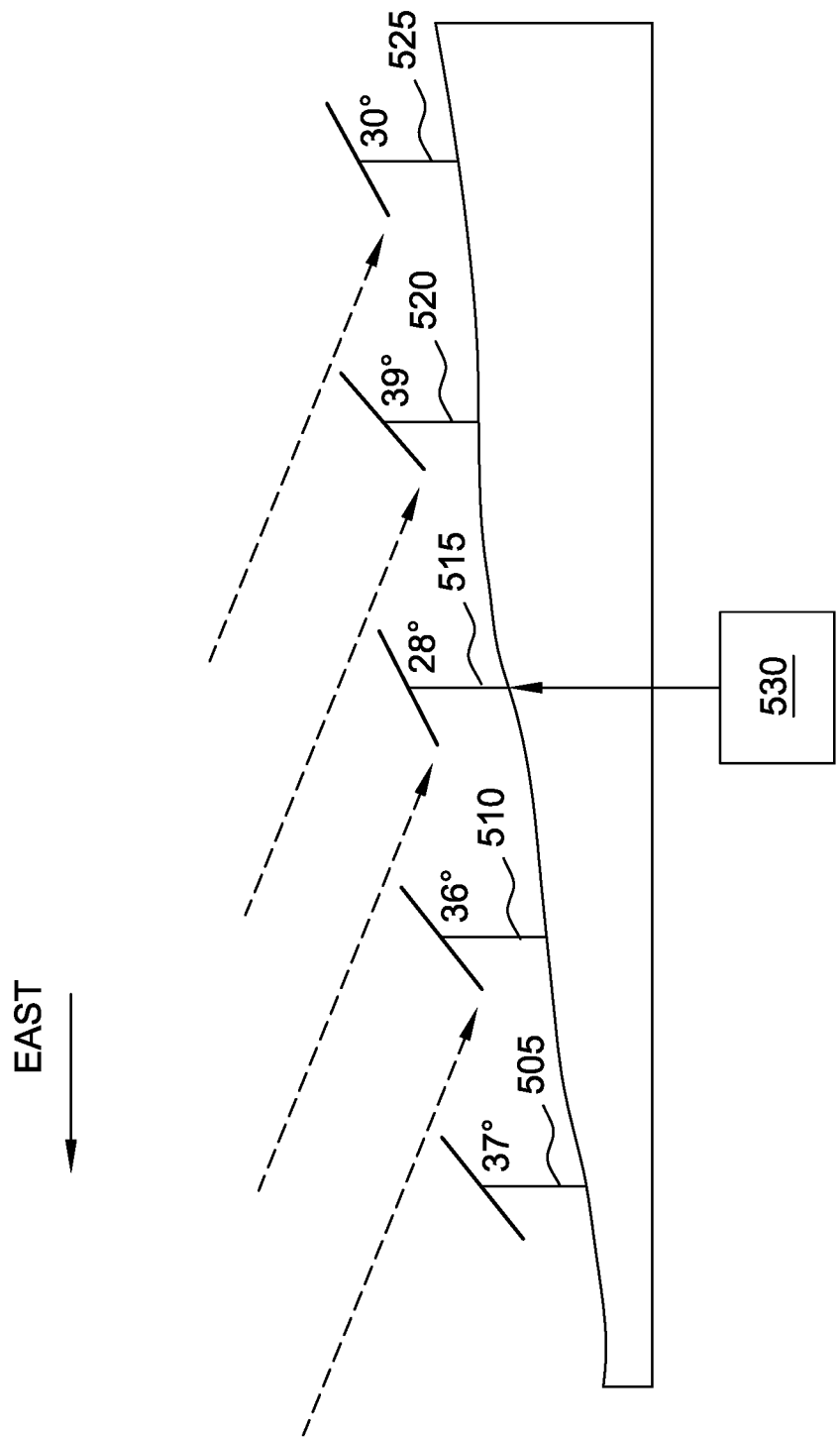
FIG. 5 illustrates a plurality of solar trackers shown in FIG. 3 on uneven terrain during backtracking.

FIG. 5 illustrates a plurality of trackers 300 (shown in FIG. 3) on uneven terrain during backtracking. During the early hours and late hours of the day, the sun 315 (shown in FIG. 3) is low on the horizon. This can cause shadows to appear on various trackers 300 because of the angle required for the plane of the tracker 300 to be normal to the angle of the sun 315.

Backtracking is an algorithm for calculating the optimum angles for the plurality of trackers 300 to prevent shadows during tracking. In the illustrated embodiment, the backtracking algorithm is executed by the row controller 410 (shown in FIG. 4). The backtracking algorithm considers eastward and westward terrain slope to determine the angle for the tracker 300 for shadow-free tracking. The backtracking algorithm uses a mathematical model of the tracker 300 to calculate and update the backtracking angles for every two degrees of the sun's movement. While the predetermined threshold is described as two degrees herein, any predetermined threshold can be used depending on how often the users desire the tracker's angle to be updated.

For calculating the optimal angle, the backtracker algorithm takes into consideration the width of the tracker 300, the distance between adjacent rows of trackers 300, the difference in elevation between the different rows of trackers 300, the current angle of the tracker 300, and the angle of the sun 315. The row controller 410 calculates the backtracking angles for the trackers 300 its row. The row controller 410 uses the backtracking algorithm to maximize the energy yield for the trackers 300 by minimizing the angle between the sun vector and the normal vector of the plane of the tracker 300 while also minimizing the shadows cast by the adjacent trackers 300.

More specifically, FIG. 5 illustrates five different trackers A-E 505, 510, 515, 520, and 525. Each of the five trackers A-E 505, 510, 515, 520, and 525 is associated with a different row. For this example, each of the five trackers A-E 505, 510, 515, 520, and 525 is currently facing in an easterly direction towards the sun 315 (shown in FIG. 3). In addition, each of the five trackers A-E 505, 510, 515, 520, and 525 are positioned at a different elevation. The different elevation could cause shading issues at certain times of day.

To account for the terrain, the row controller 410 executes a terrain based backtracking algorithm to determine an optimal angle for the tracker(s) 300 in its row based on the terrain information for the row in question and the adjacent rows to the east and the west of the row in question.

During morning backtracking, the row controller 410 sets the angle of the tracker 300 so that the shadow from an eastern, adjacent tracker 300 will come as close as possible to the lower edge of the tracker 300 in question as possible. This is because in the morning, the sun 315 is rising, so the gap between the shadow and the tracker 300 increases over time. Every time the row controller 410 adjusts the angle of the tracker 300, the shadow moves back to as close as possible to the bottom edge of the tracker 300.

During afternoon backtracking, the row controller 410 sets the angle of the tracker 300 so that the shadow from a western, adjacent tracker 300 has a gap between the shadow cast by the adjacent tracker 300 and the bottom of the tracker 300 in question. Since the sun 315 is setting, the gap will decrease over time. The goal is to have the gap disappear by the time the sun 315 has moved enough that the row controller 410 needs to move the tracker 300 again.

The row controller 410 stores the terrain information for each row including the top-of-post heights of the trackers 300 in each row. The row controller 410 also stores the size of the tracker 300 and the spacing between the rows, including any variable spacing between the rows. Other information stored by the row controller 410 includes, but is not limited to, the latitude, longitude, and altitude of the site, the current time, and the current sun position based on the exact date, time, latitude, longitude, and altitude. The row-controller 410 uses this information to model shadows to compute the exact shadow regions that will be made by the current row and the adjacent rows. The row controller 410 determines the plane of the array for each of the adjacent rows. Then the row controller 410 uses the determined planes of array for the adjacent rows to determine the plane of array for the current row. Each of the planes of arrays are calculated to maximize the amount of solar irradiance collected while minimizing the amount of shadow received and projected onto other trackers 300.

For example, tracker C 515 is associated with row controller C 530, which is similar to row controller 410. Row controller C 530 stores the top of post heights of and the distances between the trackers B, C, and D 510, 515, and 520. Based on the relative post heights of the three trackers B, C, and D 510, 515, and 520, the distance between their corresponding rows, the sizes of the three trackers B, C, & D 510, 515, and 520, the current position of the sun 315 based on the current time and the physical location of the three trackers B, C, and D 510, 515, and 520, and one or more future positions of the sun 315, the row controller C 530 is able to determine an optimal angle to set tracker C 515 to and instructs the associated rotational mechanism 310 (shown in FIG. 3) to set the tracker to that optimal angle. In at least one embodiment, the row controller 410 determines the angles for the plane of arrays for trackers B, C, and D 510, 515, and 520 as if the angles for all three are the same as each other.

All of the trackers 300 in a single row are at the same elevation in this embodiment. In alternative embodiments, some of the trackers 300 in a row are at different elevations. In these alternative embodiments, the corresponding row controller 410 calculates the angles for the trackers 300 either individually or in groups by elevation. This can include calculating the angles in groups based on the varying elevations of the adjacent rows. In some embodiments with varying elevations, the row controller 410 can use the average elevation, the lowest elevation, and/or a combination thereof to calculate the angle for the tracker 300.

Figure 6:
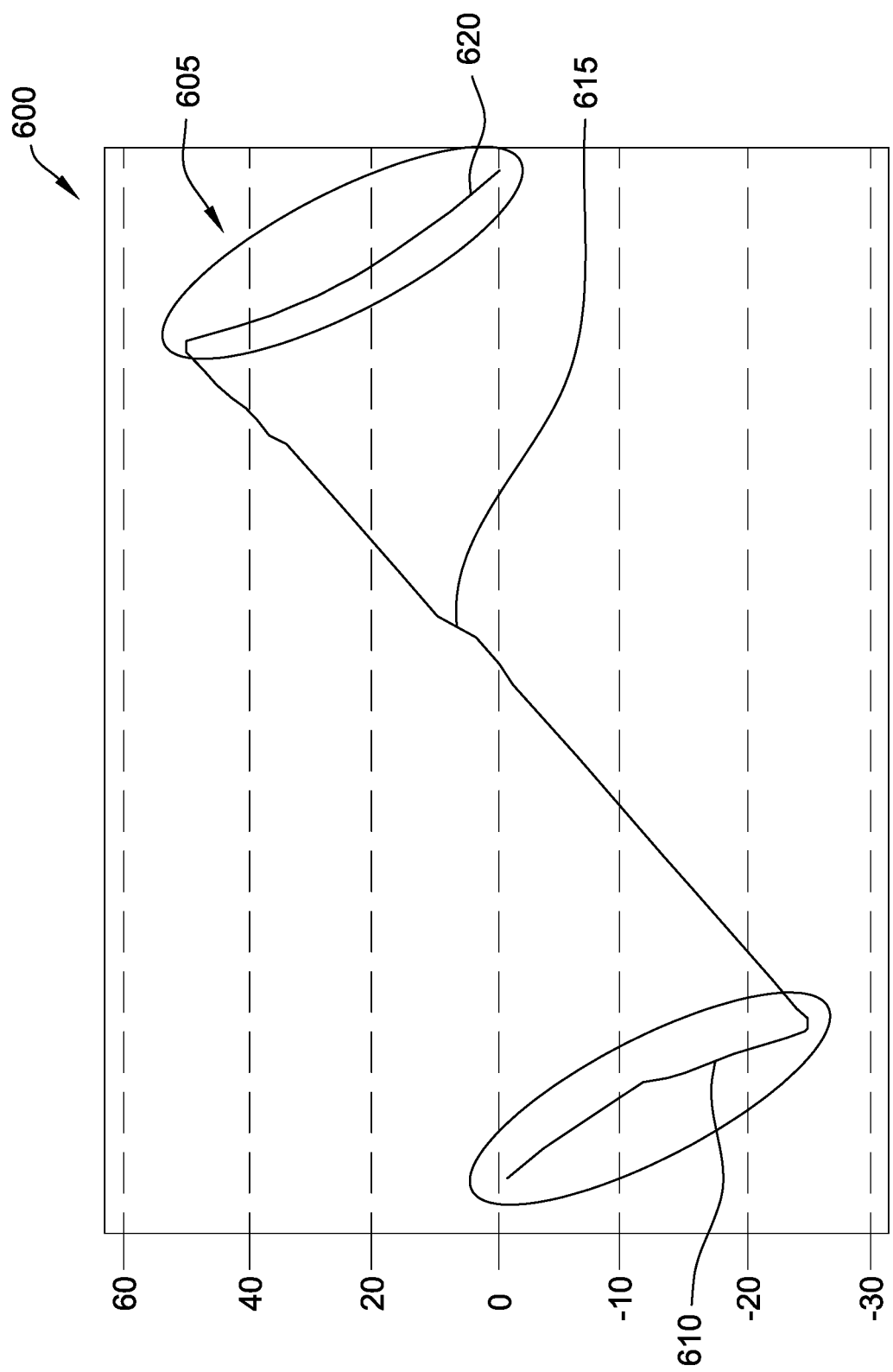
FIG. 6 illustrates an example graph of the angles for the plane of the tracker shown in FIG. 3 over the period of one day.

FIG. 6 illustrates an example graph 600 of the angles for the plane of the tracker 300 (shown in FIG. 3) over the period of one day. Line 605 illustrates the angles of the tracker 300 during a single day. At the beginning of the day, the tracker 300 is positioned using morning backtracking 610. During the majority of the day, the tracker 300 is positioned using the normal algorithm 615. At the end of the day, the tracker 300 is positioned using evening backtracking 620.

Figure 7:
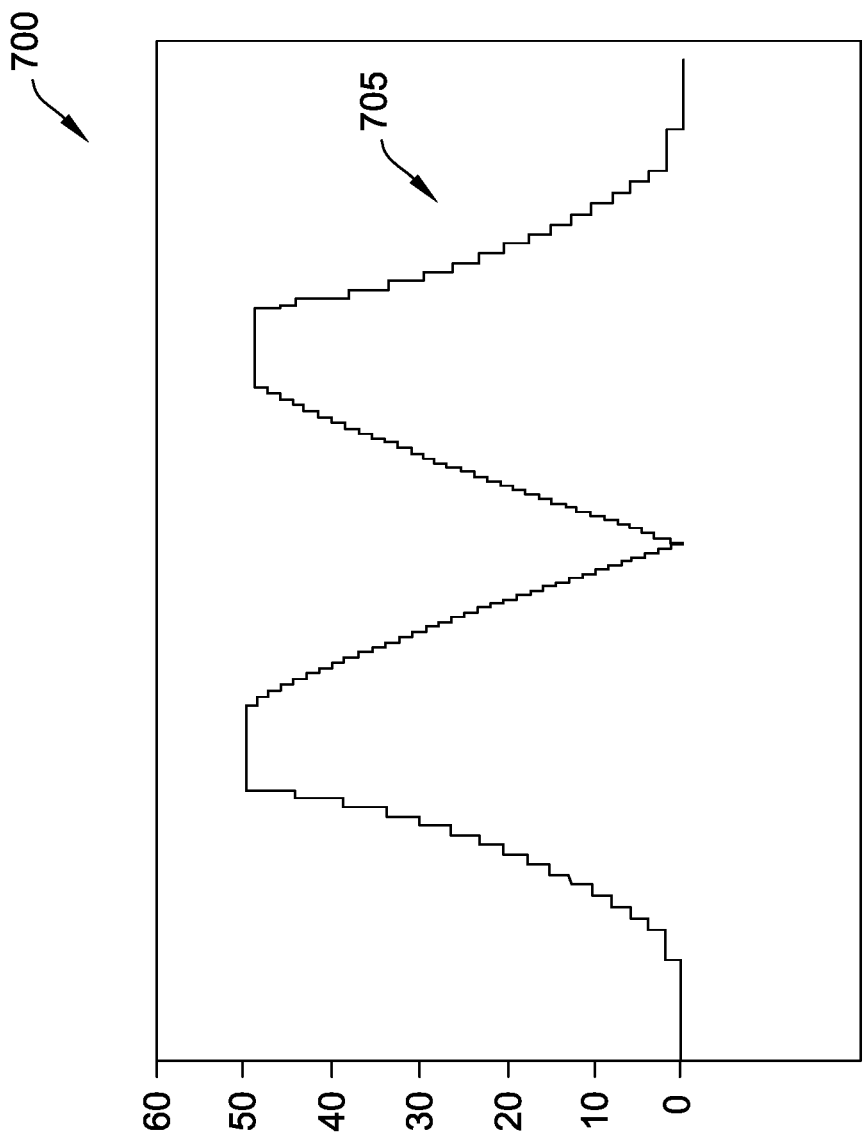
FIG. 7 illustrates another graph of the angles for the plane of the tracker shown in FIG. 3 over the period of one day.

FIG. 7 illustrates another graph 700 of the angles for the plane of the tracker 300 (shown in FIG. 3) over the period of one day. Line 705 illustrates the absolute value of the angle. In the embodiment shown in FIG. 7, the tracker 300 is stored in the horizontal position overnight.

Figure 8:
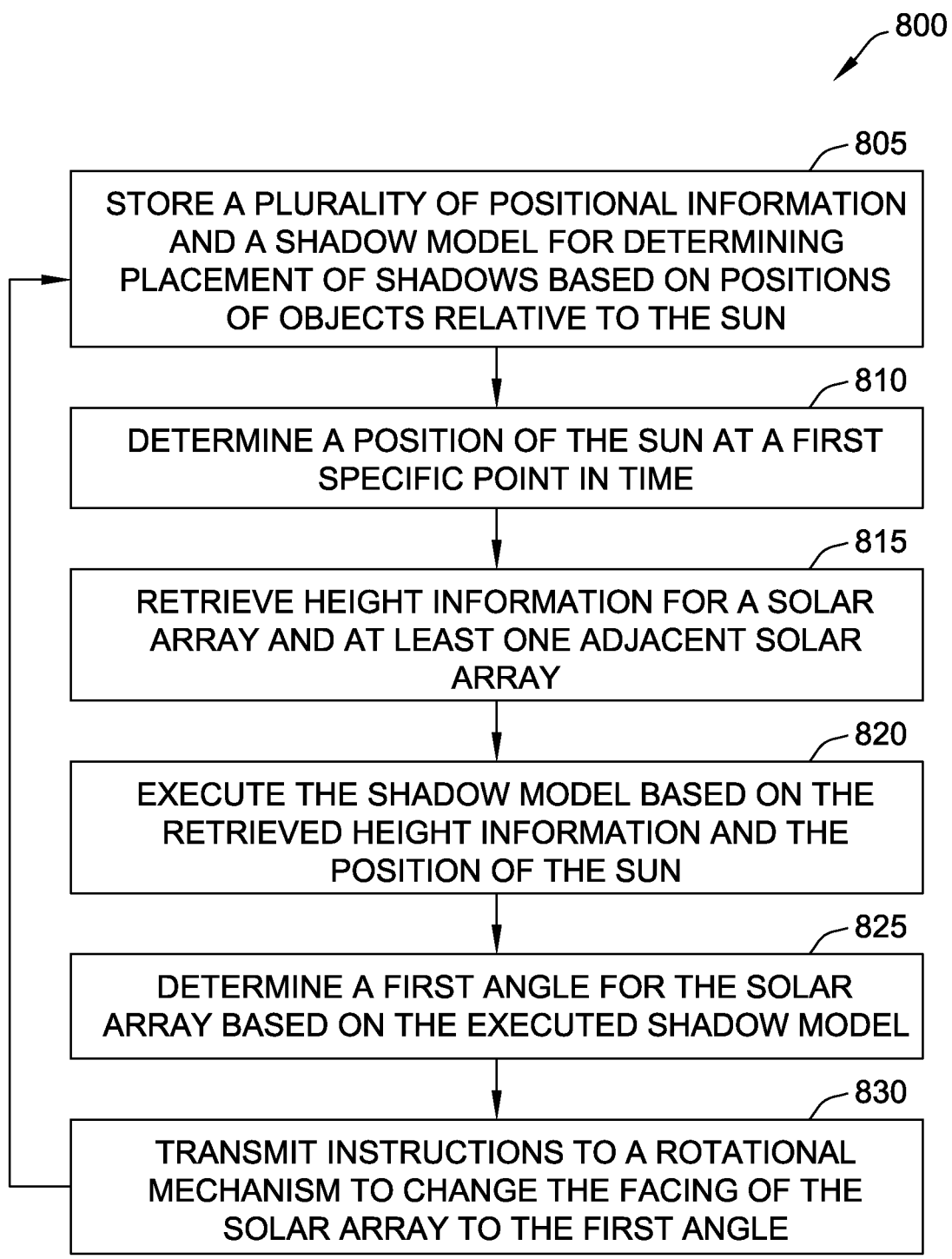
FIG. 8 illustrates a process for performing backtracking.

FIG. 8 illustrates a process 800 for performing backtracking. In this embodiment, process 800 is performed by the row controller 410 (shown in FIG. 4) controlling a single tracker 300 (shown in FIG. 3), such as tracker C 515 (shown in FIG. 5).

The row controller 410 stores 805, in at least one memory device, a plurality of positional information and a shadow model for determining placement of shadows based on positions of objects relative to the sun 315 (shown in FIG. 3).

The row controller 410 determines 810 a position of the sun 315 at a first specific point in time. The row controller 410 retrieves 815, from the at least one memory device, height information for the tracker C 515 and at least one adjacent tracker 300, such as tracker B 510 (shown in FIG. 5). A first height of the tracker 300 is different than a second height of the at least one adjacent tracker 300, such as trackers B & C 510 and 515. Both heights are based on the top of support column 305 (shown in FIG. 3) of the corresponding tracker 300. In some embodiments, the support column 305 is the same height for each tracker 300, but the relative heights of the tops of the support columns 305 is based on the terrain in which the support columns 305 are placed. In other words, a difference in the first height of the tracker 300 and a second height of the at least one adjacent tracker 300 is based on terrain where the individual tracker 300 is positioned. In this embodiment, the tracker 300 is a first tracker 300, wherein the at least one adjacent tracker 300 includes a second tracker 300 and a third tracker 300, such as trackers B & D 510 and 520 respectively, where tracker C 515 is the first tracker 300. The second tracker 300 is positioned east of the first tracker 300 and the third tracker 300 is positioned west of the first tracker 300. The first tracker 300 is in a first row. The second tracker is in a second row. The third tracker 300 is in a third row.

The row controller 410 executes 820 the shadow model based on the retrieved height information and the position of the sun 315. The row controller 410 determines 825 a first angle for the tracker 300 based on the executed shadow model. In executing the shadow model, the row controller 410 determines a first position of a first shadow cast by the second tracker 300 (aka tracker B 510). The row controller 410 can also determine a second position of a second shadow cast by the third tracker (aka tracker D 520). The row controller 410 determines the first angle for the first tracker 300 (aka tracker C 515) to avoid the first shadow and/or the second shadow.

In executing the shadow model, the row controller 410 also determines a third position of a third shadow cast by the first tracker 300 (aka tracker C 515). The row controller 410 determines the first angle for the first tracker 300 (aka tracker C 515) to avoid casting the third shadow on at least one of the second tracker 300 (aka tracker B 510) and the third tracker 300 (aka tracker D 520). In this embodiment, the row controller 410 only executes the shadow model and the backtracking process 800 when the sun 315 is low in the sky, such as when the angle between the sun 315 and a horizon is below a predetermined threshold. In alternative embodiments, the predetermined threshold is based on the second height of the at least one adjacent tracker 300.

The row controller 410 transmits 830 instructions to the rotational mechanism 310 associated with the tracker 300 to change the plane of the tracker 300 to the first angle. The plane of the tracker 300 is considered the top surface 106 (shown in FIG. 2) of the tracker 300. In some embodiments, the row controller 410 instructs every tracker 200 in the plurality of trackers 300 to the first angle.

Each tracker 300 of the plurality of trackers 300 includes a rotational mechanism 310 and the row controller 410 transmits instructions to each of the plurality of rotational mechanisms 310 to change the plane of the corresponding tracker 300 to the first angle in this embodiment. In alternative embodiments, the rotational mechanism 310 is attached to each tracker 300 of the plurality of trackers 300 and the row controller 410 instructs the rotational mechanism 310 to change the plane of the plurality of trackers 300 to the first angle.

The row controller 410 determines a second position of the sun 315 at a second specific point in time. The row controller 410 executes the shadow model based on the retrieved height information and the second position of the sun 315. The row controller 410 determines a second angle for the tracker 300 based on the executed shadow model. The row controller 410 transmits instructions to the rotational mechanism 310 to change the facing of the tracker 300 to the second angle. Steps 805 through 830 are repeated continuously during the backtracking process 800.

The row controller 410 repeats steps 805 to 830 to change the plane of the tracker 300 once the sun 315 has moved a predetermined amount. The row controller 410 determines if a difference between the position of the sun 315 and the second position of the sun 315 exceeds a predetermined threshold. This can be based on a change in angle of the sun 315 or after a specific amount of time has passed. If the difference exceeds the predetermined threshold, the row controller 410 transmits instructions to the rotational mechanism 310 to change the plane of the tracker 300 to the second angle.

During morning backtracking, the row controller 410 sets the angle of the tracker 300 so that the shadow from an eastern, adjacent tracker 300 (tracker B 510) will come as close as possible to the lower edge of the tracker 300 (tracker C 515) in question as possible. This is because in the morning, the sun 315 is rising, so the gap between the shadow and the tracker 300 increases over time. Every time the row controller 410 adjusts the angle of the tracker 300, the shadow moves back to as close as possible to the bottom edge of the tracker 300 (tracker C 515).

During afternoon backtracking, the row controller 410 sets the angle of the tracker 300 so that the shadow from a western, adjacent tracker 300 (tracker D 520) has a gap between the shadow cast by the adjacent tracker 300 (tracker D 520) and the bottom of the tracker 300 in question (tracker C 515). Since the sun 315 is setting, the gap will decrease over time. The goal is to have the gap disappear by the time the sun 315 has moved enough that the row controller 410 needs to move the tracker 300 again.

Process 800 can be performed dynamically in real time. Process 800 can also be performed in advance. For example, row controller 410 can determine all of the angles for a day based on knowing where the sun 315 will be positioned at each moment in the day. The steps of process 800 can also be performed by site controller 415 or other computer devices and the results can be provided to the row controller 410 to know when to adjust the tracker 300 and what angle to adjust the tracker 300 to.

Figure 9:
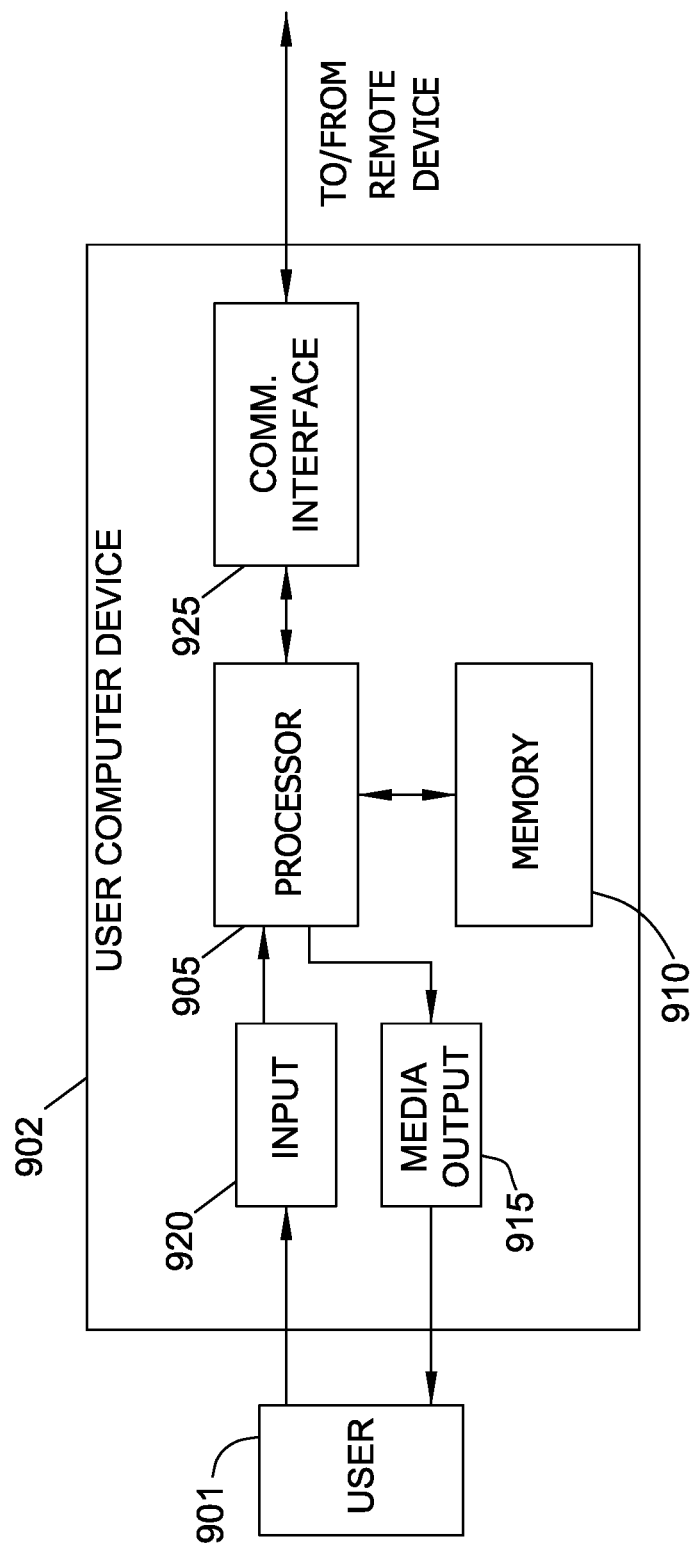
FIG. 9 illustrates an example configuration of a user computer device used in the solar site shown in FIG. 4, in accordance with one example of the present disclosure.

FIG. 9 illustrates an example configuration of a user computer device 902 used in the site 405 (shown in FIG. 4), in accordance with one example of the present disclosure. User computer device 902 is operated by a user 901. The user computer device 902 can include, but is not limited to, the row controller 410, the site controller 415, and the sensors 420 (all shown in FIG. 1). The user computer device 902 includes a processor 905 for executing instructions. In some examples, executable instructions are stored in a memory area 910. The processor 905 can include one or more processing units (e.g., in a multi-core configuration). The memory area 910 is any device allowing information such as executable instructions and/or transaction data to be stored and retrieved. The memory area 910 can include one or more computer-readable media.

The user computer device 902 also includes at least one media output component 915 for presenting information to the user 901. The media output component 915 is any component capable of conveying information to the user 901. In some examples, the media output component 915 includes an output adapter (not shown) such as a video adapter and/or an audio adapter. An output adapter is operatively coupled to the processor 905 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some examples, the media output component 915 is configured to present a graphical user interface (e.g., a web browser and/or a client application) to the user 901. A graphical user interface can include, for example, an interface for viewing the performance information about a tracker 300 (shown in FIG. 3). In some examples, the user computer device 902 includes an input device 920 for receiving input from the user 901. The user 901 can use the input device 920 to, without limitation, select to view the performance of a tracker 300. The input device 920 can include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen can function as both an output device of the media output component 915 and the input device 920.

The user computer device 902 can also include a communication interface 925, communicatively coupled to a remote device such as the site controller 415. The communication interface 925 can include, for example, a wired or wireless network adapter and/or a wireless data transceiver for use with a mobile telecommunications network.

Stored in the memory area 910 are, for example, computer-readable instructions for providing a user interface to the user 901 via the media output component 915 and, optionally, receiving and processing input from the input device 920. A user interface can include, among other possibilities, a web browser and/or a client application. Web browsers enable users, such as the user 901, to display and interact with media and other information typically embedded on a web page or a website from the row controller 410. A client application allows the user 901 to interact with, for example, the row controller 410. For example, instructions can be stored by a cloud service, and the output of the execution of the instructions sent to the media output component 915.

The processor 905 executes computer-executable instructions for implementing aspects of the disclosure. In some examples, the processor 905 is transformed into a special purpose microprocessor by executing computer-executable instructions or by otherwise being programmed. For example, the processor 905 is programmed with instructions such as those shown in FIG. 8.

Described herein are computer systems such as the row controller and related computer systems. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers; reduced instruction set circuits (RISC), application-specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object-oriented databases, and any other structured collection of records or data that is stored in a computer system. The above examples are example only, and thus are not intended to limit in any way the definition and/or meaning of the term database. Examples of RDBMS' include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer-readable medium. In an example embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

The methods and system described herein may be implemented using computer programming or engineering techniques including computer software, firmware, hardware, or any combination or subset. As disclosed above, at least one technical problem with prior systems is that there is a need for systems for a cost-effective and reliable manner for determining a direction of arrival of a wireless signal. The system and methods described herein address that technical problem. Additionally, at least one of the technical solutions to the technical problems provided by this system may include: (i) improved accuracy in determining proper angles for solar trackers, (ii) reduced shadows on solar trackers during dusk and dawn hours; (iii) increased overall solar irradiance collected; (iv) up-to-date positioning of solar trackers based on adjacent solar trackers; and (v) reduced processing power needed to calculate necessary angles for optimal solar collection.

The methods and systems described herein may be implemented using computer programming or engineering techniques including computer software, firmware, hardware, or any combination or subset thereof, wherein the technical effects may be achieved by performing at least one of the following steps: a) store, in the at least one memory device, a plurality of positional information and a shadow model for determining placement of shadows based on positions of objects relative to the sun, wherein a difference in the first height of the tracker and a second height of the at least one adjacent tracker is based on terrain where the tracker is positioned, wherein the tracker is a first tracker, wherein the at least one adjacent tracker includes a second tracker and a third tracker, wherein the second tracker is positioned east of the first tracker, and wherein the third tracker is positioned west of the first tracker, wherein the first tracker is in a first row comprising a plurality of trackers; b) determine a position of the sun at a first specific point in time; c) retrieve, from the memory device, height information for the tracker and at least one adjacent tracker, wherein a first height of the tracker is different than a second height of the at least one adjacent tracker; d) execute the shadow model based on the retrieved height information and the position of the sun; e) determine a first angle for the tracker based on the executed shadow model; f) transmit instructions to the rotational mechanism to change the plane of the tracker to the first angle; g) determine a second position of the sun at a second specific point in time; h) execute the shadow model based on the retrieved height information and the second position of the sun; i) determine a second angle for the tracker based on the executed shadow model; j) transmit instructions to the rotational mechanism to change the plane of the tracker to the second angle; k) determine if a difference between the position of the sun and the second position of the sun exceeds a predetermined threshold; l) if the difference exceeds the predetermined threshold, transmit instructions to the rotational mechanism to change the plane of the tracker to the second angle; m) instruct every tracker in the plurality of trackers to the first angle; n) transmit instructs to each of the plurality of rotational mechanisms to change the plane of the corresponding tracker to the first angle, wherein each tracker of the plurality of trackers includes a rotational mechanism; o) instruct the rotational mechanism to change the plane of the plurality of trackers to the first angle, wherein the rotational mechanism is attached each tracker of the plurality of trackers; p) determine a first position of a first shadow cast by the second tracker; q) determine a second position of a second shadow cast by the third tracker; r) determine the first angle for the first tracker to avoid the first shadow; s) determine the first angle for the first tracker to avoid the second shadow; t) determine a third position of a third shadow cast by the first tracker; u) determine the first angle for the first tracker to avoid casting the third shadow on at least one of the second tracker and the third tracker; and v) execute the shadow model when an angle between the sun and a horizon is below a predetermined threshold, wherein the predetermined threshold is based on the second height of the at least one adjacent tracker.

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium. Additionally, the computer systems discussed herein may include additional, less, or alternate functionality, including that discussed elsewhere herein. The computer systems discussed herein may include or be implemented via computer-executable instructions stored on non-transitory computer-readable media or medium.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
a tracker attached to a rotational mechanism for changing a plane of the tracker, wherein the tracker is configured to collect solar irradiance; and
a controller in communication with the rotational mechanism, the controller comprising at least one processor in communication with at least one memory device, wherein the at least one processor is programmed to:
determine a first angle for at least one adjacent tracker based on a position of the sun;
determine an amount of shadow obscuring a portion of the tracker based on the first angle and a difference between a first height of the tracker and a second height of the at least one adjacent tracker;
determine a second angle for the tracker to minimize the amount of shadow cast by the at least one adjacent tracker obscuring a portion of the tracker; and
transmit instructions to the rotational mechanism to change the plane of the tracker to the second angle.

2. The system in accordance with claim 1, wherein the at least one processor is further programmed to:
determine a second position of the sun at a second specific point in time;
determine a third angle for the tracker based on the second position of the sun; and
transmit instructions to the rotational mechanism to change the plane of the tracker to the third angle.

3. The system in accordance with claim 2, wherein the at least one processor is further programmed to:
determine if a difference between the position of the sun and the second position of the sun exceeds a predetermined threshold; and
if the difference exceeds the predetermined threshold, transmit instructions to the rotational mechanism to change the plane of the tracker to the third angle.

4. The system in accordance with claim 1, wherein the difference in the first height of the tracker and the second height of the at least one adjacent tracker is based on terrain where the tracker is positioned.

5. The system in accordance with claim 1, wherein the tracker is a first tracker, wherein the at least one adjacent tracker includes a second tracker and a third tracker, wherein the second tracker is positioned east of the first tracker, and wherein the third tracker is positioned west of the first tracker.

6. The system in accordance with claim 5, wherein the first tracker is in a first row comprising a plurality of trackers, and wherein the at least one processor is programmed to instruct every tracker in the first row to the second angle.

7. The system in accordance with claim 6, wherein each tracker of the plurality of trackers includes a rotational mechanism, and wherein the at least one processor is further programmed to transmit instructs to each of a plurality of rotational mechanisms associated with the plurality of trackers to change the plane of the corresponding tracker to the second angle.

8. The system in accordance with claim 6, wherein the rotational mechanism is attached each tracker of the plurality of trackers, and wherein the at least one processor is further programmed to instruct the rotational mechanism to change the plane of the plurality of trackers to the second angle.

9. The system in accordance with claim 5, wherein the at least one processor is further programmed to:
determine a first position of a first shadow cast by the second tracker; and
determine the second angle for the first tracker to avoid the first shadow.

10. The system in accordance with claim 9, wherein the at least one processor is further programmed to:
determine a second position of a second shadow cast by the first tracker; and
determine the second angle for the first tracker to avoid casting the second shadow on the third tracker.

11. The system in accordance with claim 5, wherein the at least one processor is further programmed to:
determine a first position of a first shadow cast by the third tracker; and
determine the second angle for the first tracker to avoid the first shadow.

12. The system in accordance with claim 1, wherein the at least one processor is further programmed to execute a shadow model when an angle between the sun and a horizon is below a predetermined threshold, wherein the predetermined threshold is based on the second height of the at least one adjacent tracker.

13. The system in accordance with claim 1, wherein the at least one processor is further programmed to determine the first angle for the tracker and the at least one adjacent tracker, wherein the first angle of the at least one adjacent tracker is assumed to be the same as the first angle for the tracker.

14. The system in accordance with claim 1, wherein the at least one processor is further programmed to use height information and distance information between the tracker and the at least one adjacent tracker to execute a shadow model to compute exact shadow regions cast by the tracker and the at least one adjacent tracker.

15. A method for operating a tracker, the method implemented by at least one processor in communication with at least one memory device:
determining a first angle for at least one adjacent tracker based on a position of the sun;
determining an amount of shadow obscuring a portion of the tracker based on the first angle and a difference between a first height of the tracker and a second height of the at least one adjacent tracker;
determining a second angle for the tracker to minimize the amount of shadow cast by the at least one adjacent tracker obscuring a portion of the tracker; and
transmitting instructions to change a plane of the tracker to the second angle.

16. The method in accordance with claim 15 further comprising:
determining a second position of the sun at a second specific point in time;

determining a third angle for the tracker based the second position of the sun; and transmitting instructions to change the plane of the tracker to the third angle.

17. The method in accordance with claim 16 further comprising:

determining if a difference between the position of the sun and the second position of the sun exceeds a predetermined threshold; and if the difference exceeds the predetermined threshold, transmitting instructions to change the plane of the tracker to the third angle.

18. A controller for a tracker, the controller including at least one hardware processor in communication with at least one memory device, the at least one processor programmed to:

determine a first angle for at least one adjacent tracker based on a position of the sun;

determine an amount of shadow obscuring a portion of the tracker based on the first angle and a difference between a first height of the tracker and a second height of the at least one adjacent tracker;

determine a second angle for the tracker to minimize the amount of shadow cast by the at least one adjacent tracker obscuring a portion of the tracker; and transmit instructions to change a plane of the tracker to the second angle.

19. The controller in accordance with claim 18, wherein the at least one processor is further programmed to:

determine a second position of the sun at a second specific point in time;

determine a third angle for the tracker based on the second position of the sun; and transmit instructions to change the plane of the tracker to the third angle.

20. The controller in accordance with claim 18, wherein the tracker is a first tracker, wherein the at least one adjacent tracker includes a second tracker and a third tracker, wherein the second tracker is positioned east of the first tracker, wherein the third tracker is positioned west of the first tracker, and wherein the at least one processor is further programmed to:

determine a first position of a first shadow cast by the second tracker;

determine a second position of a second shadow cast by the first tracker; and determine the second angle for the first tracker to avoid the first shadow and to avoid casting the first shadow on the third tracker.

\* \* \* \* \*